United States Patent [19]

Wilson

[11] Patent Number: 4,500,942

[45] Date of Patent: Feb. 19, 1985

[54] TEMPERATURE STABLE MONOLITHIC CAPACITORS AND CERAMIC COMPOSITIONS FOR PRODUCING SAME

[75] Inventor: James M. Wilson, Victor, N.Y.

[73] Assignee: Ferro Corporation, Cleveland, Ohio

[21] Appl. No.: 440,804

[22] Filed: Nov. 12, 1982

[51] Int. Cl.$^3$ .................. H01G 4/12; C04B 35/46
[52] U.S. Cl. .................. 361/320; 361/321; 501/138; 501/139
[58] Field of Search .............. 501/138, 139; 361/320, 361/321

[56] References Cited

U.S. PATENT DOCUMENTS

| | | | |
|---|---|---|---|
| 3,775,142 | 11/1973 | Roup | 501/136 |
| 3,811,937 | 5/1974 | Maher | 501/139 |
| 4,082,906 | 4/1978 | Amin et al. | 501/139 |
| 4,283,753 | 8/1981 | Burn | 501/138 |
| 4,338,403 | 7/1982 | Kawashima et al. | 501/139 |
| 4,394,456 | 7/1983 | Sakabe et al. | 501/139 |

FOREIGN PATENT DOCUMENTS

| | | | |
|---|---|---|---|
| 55-131901 | 10/1980 | Japan | 501/139 |
| 57-40806 | 3/1982 | Japan | 501/139 |
| 57-65605 | 4/1982 | Japan | 501/139 |
| 57-80604 | 5/1982 | Japan | 501/139 |
| 57-156367 | 9/1982 | Japan | 501/139 |
| 57-174806 | 10/1982 | Japan | 501/139 |
| 1442285 | 7/1976 | United Kingdom | 501/139 |

OTHER PUBLICATIONS

Muhlstadt, W. J.; "The Effect of Rare Earth Oxides on Barium Titanate Class I Capacitors", Master of Science in Ceramic Engineering Thesis, University of Illinois, 1968.

Primary Examiner—Mark Bell
Attorney, Agent, or Firm—Shlesinger, Fitzsimmons & Shlesinger

[57] ABSTRACT

Multilayer ceramic capacitors, and in particular NPO class capacitors are produced from dielectric compositions comprising a mixture of BaO, PbO, $Nd_2O_3$, $Bi_2O_3$, $TiO_2$ and one of the rare earth oxides selected from the group consisting of $Pr_6O_{11}$ and $Sm_2O_3$, the selected rare earth oxide being present in an amount ranging from approximately 10 to 100 wt. % of the amount of $Nd_2O_3$ in the mixture. In one embodiment an acrylic binder is added to the mixture to produce ceramic sheets which are screen printed with a Pt-Pd-Au electrode, and then cut into thin layers, stacked, laminated, sintered and terminated to produce a multilayer capacitor having an extremely stable TC and effective dielectric constant as high as 120. A high bismuth glass frit composition may be mixed with the dielectric ceramic mixture to produce a low sintering temperature mixture which is processed as above and then screen printed with a Ag-Pd alloy and laminated to produce a multilayer capacitor which can be sintered at a temperature as low as 1100° C.

11 Claims, No Drawings

TEMPERATURE STABLE MONOLITHIC CAPACITORS AND CERAMIC COMPOSITIONS FOR PRODUCING SAME

BACKGROUND OF THE INVENTION

This invention relates to improved high dielectric constant ceramic compositions, and remarkably temperature-stable, monolithic capacitors made therefrom. Even more particularly, this invention relates to improved NPO ceramic compositions produced from a BaO, PbO, $Nd_2O_3$, $Bi_2O_3$ and $TiO_2$ mixture in which $Nd_2O_3$ has been at least partially replaced by the rare earth oxide $Pr_6O_{11}$ or $Sm_2O_3$ selectively to shift the composition negatively or positively, respectively.

Most known NPO dielectric compositions (i.e., maximum allowable change in capacitance over temperature range of $-55°$ C. to $+125°$ C. is $\pm 30$ p.p.m./°C.) have relatively low dielectric constants (K), e.g. in the range of 36 to 60. Although U.S. Pat. No. 3,775,142 discloses NPO compositions containing neodymium oxide ($Nd_2O_3$), and having K values as high as 87, such compositions are limited by the fact that they can contain other rare earth oxides in quantities up to only about 1.0 mole percent, and preferably less than about 0.6 percent.

U.S. Pat. No. 3,811,937 also suggests the use of neodymium oxide in the preparation of high temperature ceramic dielectric compositions produced from the ternary system of BaO, $TiO_2$ and $Nd_2O_3$. However, this patent merely suggests that TC values ranging all the way from $-1,000$ p.p.m./°C. to $+200$ p.p.m./°C. and K values from 125 to 30, respectively, could be achieved, provided such compositions were to be mixed and sintered with a low firing glass frit. Although it also suggests that calcium titanate can be added to the dielectric composition to produce high negative TC bodies having lower dielectric constants, it does not teach how to produce a series of NPO dielectric compositions based on $BaO,TiO_2,Nd_2O_3$ system, and which have unusually high dielectric constants and low sintering temperature characteristics.

It is an object of this invention, therefore, to provide improved NPO dielectric ceramic compositions having a substantially higher K value than prior such compositions.

It is an object also to provide an improved ceramic composition of the type described in which a portion of its $Nd_2O_3$ component is replaced by another rare earth oxide selectively to shift its temperature coefficient of dielectric constant either negatively or positively.

Another object of this invention is to produce from certain such compositions improved high fire, high K, ceramic monolithic capacitors.

A further object is to provide an extremely temperature stable monolithic capacitor produced from a dielectric composition in combination with a glass frit which enables the sintering of the mixture at a temperature substantially lower than prior such mixtures.

SUMMARY OF THE INVENTION

The ceramic compositions disclosed herein are formulated from the oxides of lead, barium, neodymium, bismuth, and titanium, and preferably with small quantities of samarium oxide ($Sm_2O_3$) or praseodymium oxide ($Pr_6O_{11}$) added to replace a minimum of approximately 10 wt. % of the neodymium oxide ($Nd_2O_3$). The result is a Class 1 (NPO) composition having a temperature coefficient of dielectric constant (TC) within the recognized envelope or range of $\pm 30$ p.p.m./°C., and a dielectric constant ranging from 84.0 to 120.0. These compositions can be mixed with a fritted sintering aid to enable low temperature sintering (1080-1100° C.) for use with high silver content electrodes.

By displacing or replacing a quantity of $Nd_2O_3$ with $Pr_6O_{11}$, it has been discovered that a negative shifting of the temperature coefficients (TC) can be effected, while on the other hand by replacing the same quantity of $Nd_2O_3$ with $Sm_2O_3$, a positive shifting of the TC is effected. To maintain the compositions within the NPO envelope, however, the amount of $Nd_2O_3$ replaced by one of the two above-noted rare earth oxides preferably is in the range of greater than 10% and less than 50%.

DETAILED DESCRIPTION OF THE PREFERRED EMBODIMENTS

The novel ceramic compositions disclosed herein may be formulated from mixtures of the oxides of PbO, BaO, and $Nd_2O_3$, which has been at least partially displaced by $Sm_2O_3$ and $Pr_6O_{11}$, $Bi_2O_3$, and $TiO_2$. For example, each of the sample compositions listed in the following Table I were wet mixed in a lined porcelain jar mill containing $ZrO_2$ media. The resultant slurry was passed through a 325 mesh screen, dried, crushed, and calcined at 1100° C. for 1 hour. The calcined mixture was pulverized in a laboratory size micropulverizer to form a well reacted, fine particle size powder. A 5% $PVA + H_2O$ solution was mixed at 10% by weight with the calcined powder. Discs approximately 0.5" in diameter and 0.035" in thickness were pressed and sintered at temperatures ranging from 1225° to 1350° and were silver terminated.

TABLE I

| | Composition in Wt. % | | | | | | |
|---|---|---|---|---|---|---|---|
| Sample | BaO | PbO | $Nd_2O_3$ | $Pr_6O_{11}$ | $Sm_2O_3$ | $Bi_2O_3$ | $TiO_2$ |
| #1 | 16.436 | 2.27 | 31.319 | 3.48 | — | 9.479 | 37.015 |
| #2 | 16.436 | 2.27 | 17.40 | 17.40 | — | 9.479 | 37.015 |
| #3 | 16.436 | 2.27 | — | 34.80 | — | 9.479 | 37.015 |
| #4 | 16.436 | 2.27 | 34.80 | — | — | 9.479 | 37.015 |
| #5 | 16.436 | 2.27 | 31.319 | — | 3.48 | 9.479 | 37.015 |
| #6 | 16.436 | 2.27 | 17.40 | — | 17.40 | 9.479 | 37.015 |
| #7 | 16.436 | 2.27 | — | — | 34.80 | 9.479 | 37.015 |

The $Nd_2O_3$ employed in the above samples was approximately 95 wt. % pure, the balance being 5 wt% of the rare earth oxides of $Sm_2O_3$ and $Pr_6O_{11}$. Moreover, the BaO and $Nd_2O_3$ were added as carbonates, and the wt. % was based on the calcined material. An average of about eight to ten disc capacitors for each of the samples in Table I were tested and exhibited the properties indicated in the following Table II.

TABLE II

| | Electrical Properties of × Disc Capacitors | | | | | |
|---|---|---|---|---|---|---|
| Sample | Dielectric constant K | Dissipation factor % | Temperature Coefficient of dielectric constant | | | Insulation Resistance 500 vdc |
| | | | $-55°$ C. | $+85°$ C. | $+125°$ C. | |
| #1 | 102.5 | .04 | P003 | N004 | N008 | $>10 \times 10^{12}\Omega$ |
| #2 | 93.5 | .04 | N023 | N041 | N046 | $>10 \times 10^{12}\Omega$ |
| #3 | 79.6 | .00 | N127 | N134 | N134 | $>10 \times 10^{12}\Omega$ |
| #4 | 83.0 | .00 | N033 | N027 | N015 | $>10 \times 10^{12}\Omega$ |

TABLE II-continued

Electrical Properties of ×Disc Capacitors

| Sample | Dielectric constant K | Dissipation factor % | Temperature Coefficient of dielectric constant | | | Insulation Resistance 500 vdc |
|---|---|---|---|---|---|---|
| | | | −55° C. | +85° C. | +125° C. | |
| #5 | 84.0 | .01 | N014 | N016 | N022 | >10 × $10^{12}\Omega$ |
| #6 | 83.0 | .005 | P046 | P027 | P021 | >10 × $10^{12}\Omega$ |
| #7 | 77.0 | .03 | P060 | P041 | P092 | >10 × $10^{12}\Omega$ |

By proper selection of compositions similar to the above-noted samples, it is possible to create a series of temperature compensating formulations such as E.I.A. temperature characteristic codes, COG, SIG, UIG an P2G. Sample compositions #1 and #5, for example, meet the E.I.A. specification for NPO type dielectrics; but even more important is the fact that disc capacitors made from sample #1 compositions exhibit a dielectric constant above 100 and an extremely stable TC. Another factor to be observed from these tables is that as the quantity of $Pr_6O_{11}$ increases from approximately 10 wt. % of $Nd_2O_3$, the slope of the associated TC swings negatively. Conversely, as the quantity of $Sm_2O_3$ increases from 10 wt. % of $Nd_2O_3$ in Sample #5 to 50% in Sample #6 and 100% in Sample #7 the corresponding TC values swing in the positive direction.

A high sintering temperature, monolithic capacitor was produced from a sample #1 composition, which was produced as above, except that after the calcining step the dielectric powder was mixed with a solvent-based acrylic binder system. The resultant slip was cast into sheets, cut to size, and screen printed with a Pt-Pd-Au alloy electrode material. The sheets were then stacked, laminated and cut into individual multilayer capacitors having a conventional configuration, such as for example as illustrated in FIG. 2 of my pending U.S. application Ser. No. 349,849, filed Feb. 18, 1982, now U.S. Pat. No. 4,379,319, issued Apr. 15, 1983. Results of the tests conducted on thirty or more samples of these capacitors are summarized in Table III.

It is also possible to produce low sintering temperature and very high permittivity NPO multilayer capacitor utilizing this series of compositions. Samples #4 and #5, for example, were recalcined at 1250° C. and the resultant materials were pulverized and milled to form a fine powder of approximately 1.5 μm. average particle size. Each of these materials was wet mixed in a 90/10 ratio with fine fritted glass powder also of approximately 1.5 μm. average particle size. The glass was essentially a high bismuth $PbO,BaO,Bi_2O_3,B_2O_3,SiO_2$ composition. The respective slurries were dried, cast into sheets of ceramic material, and formed into multilayer capacitors as described above, except that 70Ag/30Pd internal electrodes were applied. Multilayer capacitors manufactured in this manner from samples #4 and #5 gave the results which are compared in Table III with those of the capacitors made from sample #1.

TABLE III

| | | Multilayer Capacitors Made From: | | |
|---|---|---|---|---|
| | | Sample #1 W/O Glass Frit | Sample #4 With Glass Frit | Sample #5 With Glass Frit |
| Electrode | | 20Pt/20Pd/60Au | 70Ag/30Pd | 70Ag/30Pd |
| Sint. Temp. (°C.) | | 1275 | 1100 | 1100 |
| Avg. Cap. (pfd) | | 1870 | 1838.5 | 1911.1 |
| % D.f. | | 0.03 | 0.03 | 0.03 |
| IR(25° C.) | $10^6$ megΩ × ufd | >18,700 | >18,380 | >19,000 |
| IR(85° C.) | | 14,919 | 2513 | 2930 |
| IR(125° C.) | | 1,865 | 726 | 1367 |
| TC(−55° C.) | | P020 | P001 | P010 |
| TC(85° C.) | | N012 | N008 | N004 |
| TC(125° C.) | | N011 | N009 | N005 |
| Effective diel. const. | | 120 | 84 | 89 |

In Table III the insulation resistance (IR) values were determined by impressing 50 volts DC across the respective capacitors when they were at the indicated temperatures, measuring the resistance and capacitance across the capacitor, and multiplying these values by one another. The TC values (change dielectric constant with temperature), which are expressed in parts per million per degree centigrade, have the prefix P if the capacitor has a positive temperature coefficient slope at the indicated operating temperature, and N if a negative slope. For example, P001 indicates that for every degree Centigrade that the operating temperature increases, the capacity will increase one part per million, while N012 indicates it would drop 12 parts per million.

As shown by the results listed in Table III, the high sintering temperature monolithic capacitors prepared from sample #1 have even higher effective dielectric constants than the disc capacitors made therefrom—i.e., 120 vs. 102.5. As compared with known NPO compositions, this constitutes a very substantial increase in the K values. Furthermore, although the TC range for the monolithic capacitors of sample #1 has expanded somewhat as compared to that of the corresponding disc capacitors, it is still wel within the NPO envelope of ±30 p.p.m./C°.

In the case of the NPO monolithic capacitors made from samples #4 and #5 in combination with the high bismuth content sintering aid, although the dielectric constants are not quite as high as those exhibited by sample #1 capacitors, nevertheless the former have the advantage that they can be sintered at substantially lower temperatures (1100° C. v. 1275° C.), thus enabling the use of more inexpensive electrode compositions.

From the foregoing, it will be apparent that the present invention will permit the production of extremely temperature stable, monolithic capacitors, which fully meet E.I.A. specifications for NPO capacitors, and which have dielectric constants substantially higher than prior such capacitors. Moreover, by selectively adding the rare earth oxides of $PR_6O_{11}$ or $Sm_2O_3$ in quantities of between 10% and 50% of the $Nd_2O_3$ component in the composition, the TC slope of the resultant capacitor can be made to shift negatively or positively, respectively. Furthermore, by using a high bismuth content sintering aid, these compositions can produce a low sintering temperature, high dielectric constant, monolithic capacitor having a TC range falling well within the ±30 p.p.m./°C. envelope required for NPO Class 1-type capacitors.

While this invention has been illustrated and described in detail in connection with only certain embodiments thereof, it will be apparent that it is capable of still further modification, and that this application is intended to cover any such modifications as may fall within the scope of one skilled in the art, or the appended claims.

What I claim is:

1. A ceramic temperature compensating dielectric composition in fine particle form having a dielectric constant of 84.0 or greater and consisting essentially of a mixture of BaO, PbO, $Bi_2O_3$, $TiO_2$ in quantities of approximately 16, 2, 9 and 37 wt. %, respectively, and rare earth oxides in an amount not exceeding approximately 35 wt.% of said mixture, said rare earth oxides consisting essentially of $Nd_2O_3$ and one of the additional rare earth oxides selected from the group consisting of $Pr_6O_{11}$ and $Sm_2O_3$, said $Nd_2O_3$ being present in amounts ranging from approximately 17.4 to 31.3 wt.% of the overall mixture, and said additional rare earth oxide being present in an amount ranging from approximately 10 to 50 wt. % of the total amount of rare earth oxides present in the mixture.

2. A composition as defined in claim 1, wherein the amount of $Nd_2O_3$ in said mixture is inversely proportional to the amount of said additional rare earth oxide present in the mixture.

3. A composition as defined in claim 1, having a temperature coefficient of dielectric constant in the range of ±30 p.p.m/°C., and a dielectric constant in the range of from 84 to 102.5.

4. In a capacitor of the NPO variety having a fired ceramic substrate, a dielectric constant greater than 84.0 and a TC in the range of ±30 p.p.m./°C., the improvement wherein said substrate is made from a ceramic dielectric composition consisting essentially of a mixture of BaO, PbO, $Bi_2O_3$, $TiO_2$ in quantities of approximately 16, 2, 9 and 37 wt. %, respectively, and the rare earth oxides present in amounts up to approximately 35 wt. % of said mixture, said rare earth oxides consisting essentially of $Nd_2O_3$ and one of the additional rare earth oxides selected from the group consisting of $Pr_6O_{11}$ and $Sm_2O_3$, said $Nd_2O_3$ being present in amounts ranging from approximately 17.4 to 31.3 wt. % of the overall mixture, and said additional rare earth oxides being present in an amount ranging from approximately 10-50 wt. % of the total amount of rare earth oxides present in the mixture.

5. A capacitor as defined in claim 4, wherein said fired ceramic substrate further includes a fritted glass powder.

6. In a multilayer capacitor of the type comprising a sintered multilayer ceramic matrix having therein screen printed electrodes, and having a dielectric constant of 84.0 or greater the improvement wherein said matrix consists essentially of a mixture of BaO, PbO, $Bi_2O_3$, $TiO_2$ in quantities of approximately 16, 2, 9 and 37 wt. %, respectively, and rare earth oxides, consisting essentially of $Nd_2O_3$ and one of the additional rare earth oxides selected from the group consisting of $Pr_6O_{11}$ and $Sm_2O_3$, said additional rare earth oxide being present in an amount ranging from approximately 3.48 to 17.4 wt. % of the overall mixture, and approximately 10 to 50 wt. % of the total amount of rare earth oxides present in the mixture.

7. A multilayer capacitor as defined in claim 6, wherein up to a maximum the quantity of $Nd_2O_3$ is inversely proportional to the quantity of said additional rare earth oxide present in the mixture.

8. A multilayer capacitor as defined in claim 7, wherein said matrix includes an acrylic binder and said electrodes are made from a Pt-Pd-AU alloy.

9. A multilayer capacitor as defined in claim 7, wherein said matrix further comprises a fritted glass powder.

10. A multilayer capacitor as defined in claim 9, wherein said electrodes are made from a Ag-Pd alloy.

11. A multilayer capacitor as defined in claim 6, having a dielectric constant in the range of 84 to 120, and a temperature coefficient of dielectric constant in the range of ±30 p.p.m./°C.

* * * * *